United States Patent [19]

Rayburn

[11] 4,431,911
[45] Feb. 14, 1984

[54] CASH REPLACEMENT SYSTEM INCLUDING AN ENCODED CARD AND CARD ACCEPTOR

[76] Inventor: Charles C. Rayburn, 1446 N. Bridgeport Dr., Mount Prospect, Ill. 60056

[21] Appl. No.: 307,466

[22] Filed: Oct. 1, 1981

Related U.S. Application Data

[63] Continuation-in-part of Ser. No. 262,096, May 11, 1981, abandoned.

[51] Int. Cl.³ .............................................. G06K 7/04
[52] U.S. Cl. .................................... 235/444; 235/443; 235/445
[58] Field of Search ............... 235/444, 434, 443, 445, 235/485, 494

[56] References Cited

U.S. PATENT DOCUMENTS

| 2,798,668 | 7/1957 | Watkin | 235/485 |
| 3,239,808 | 3/1966 | Elliott | 235/445 |
| 3,542,978 | 11/1970 | Collier | 235/443 |
| 3,827,058 | 7/1974 | Brener | 235/434 |
| 4,172,552 | 10/1979 | Case | 235/434 |
| 4,204,637 | 5/1980 | Gray | 235/434 |

FOREIGN PATENT DOCUMENTS 2557984 1/1977 Fed. Rep. of Germany ...... 235/382

Primary Examiner—Harold I. Pitts
Attorney, Agent, or Firm—David I. Roche; Donald D. Mondul; Thomas W. Buckman

[57] ABSTRACT

A cash replacement system including an encoded plastic card and a card acceptor mechanism is provided by punching a number of specially shaped apertures with predetermined orientations into the card. The acceptor mechanism which receives the card has a sensor pin aligned with each of the punched apertures of the plastic card. The sensor pins have a probe section at one end which is shaped to substantially conform to the shape of the punched apertures of the plastic card so that when they are in alignment with the apertures the probe sections will fit in the apertures as the sensor pins are depressed toward the card. The sensor pin also has a surface area adjacent the probe section which engages the card so that when the probe section extends through the aperture it insures that the aperture is of the correct shape and orientation. The sensor pins are lowered toward the card by a drive mechanism which is linked to a handle or other control device. The upper end of the sensor pins have grooves in them, and an operating plate is driven by the control device which has protrusions that pass through these grooves when all of the sensor pins are located in the holes of the punch card with the proper orientation. If no hole is present in the card, or if the opening is too wide, so that the aperture does not correspond to the particular desired shape, the corresponding sensor pin will pass entirely through the aperture and the protrusions on the operating plate will not pass through the grooves and the control device will not be actuated sufficiently to produce the desired result, such as opening a door of a vending machine.

20 Claims, 24 Drawing Figures

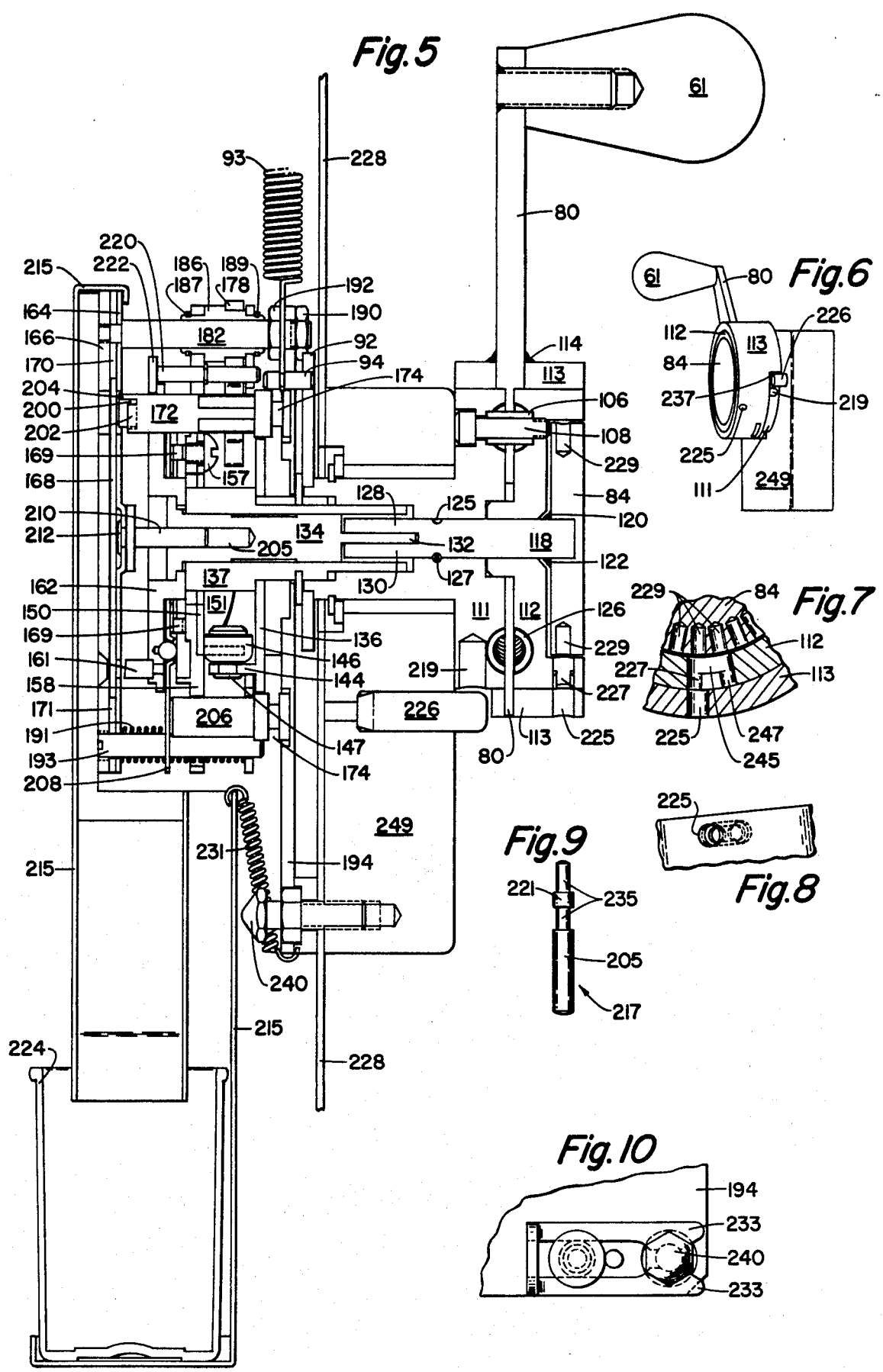

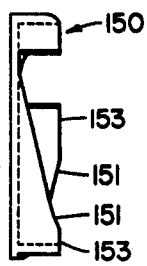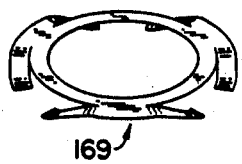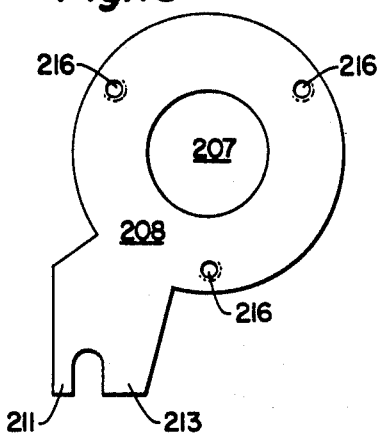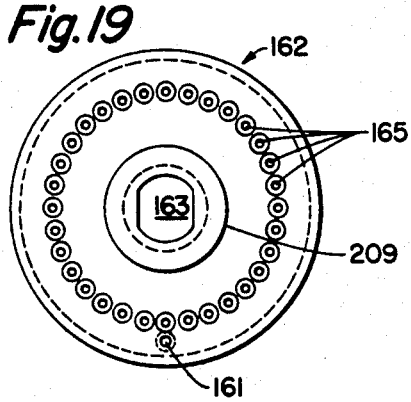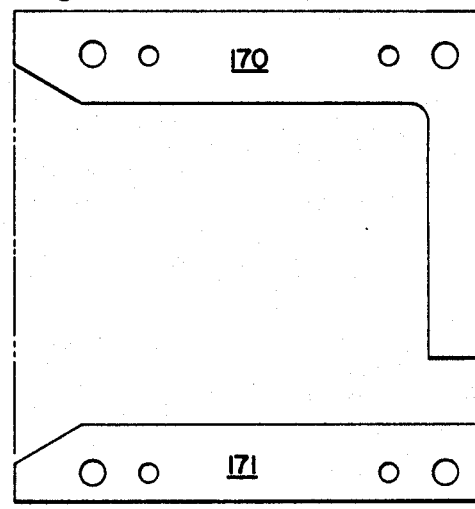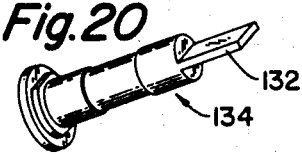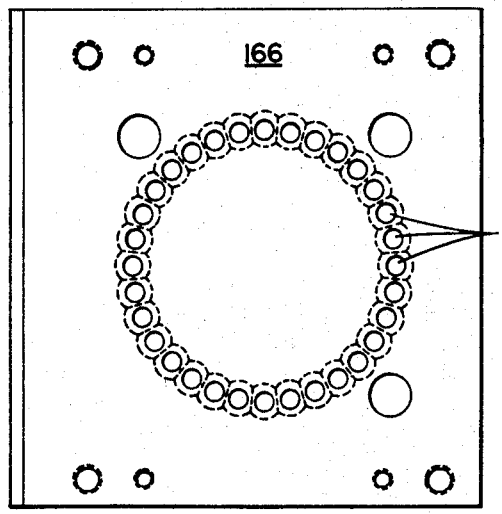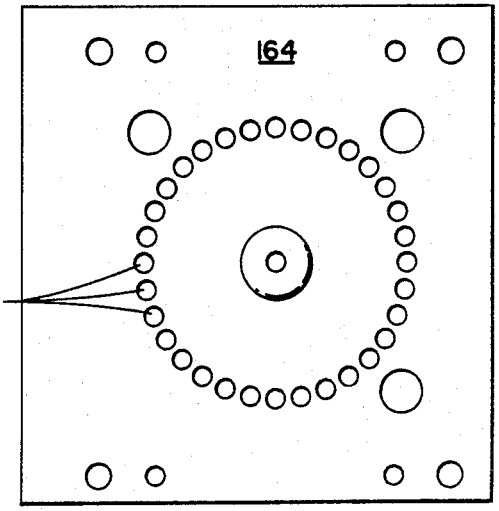

CASH REPLACEMENT SYSTEM INCLUDING AN ENCODED CARD AND CARD ACCEPTOR

BACKGROUND OF THE INVENTION

This application is a continuation-in-part of prior pending Patent Application Ser. No. 262,096, filed May 11, 1981, in the name of Charles Calvin Rayburn, now abandoned.

A number of cash replacement systems employing encoded cards of various types have been previously proposed. One such type of replacement system is illustrated by a number of patents issued to the Dennison Manufacturing Company of Framingham, Massachusetts in which a multiple ticket containing a number of severable individual tickets was employed. The detachable sections are provided with magnetic encoding for the purpose of auditing and identification of the severable tickets. Various versions of systems of this type are shown in U.S. Pat. Nos. 3,553,440, 3,727,031, and 3,798,422, which are assigned to the Dennison Manufacturing Company. A somewhat similar type of system is shown in recently issued U.S. Pat. No. 4,271,351, issued June 2, 1981 to William T. Bloodworth.

The severable and magnetically encoded type of multiple ticket is difficult to handle and store since the size of the ticket changes in accordance with the number of severable portions that are detached; and furthermore, there is always the possibility of the customer losing one or more of the detachable portions. In addition, the use of the card requires an electrical card acceptor reading element which can electrically decode the magnetic encoding and, therefore, is relatively expensive and prohibitive for various embodiments in which it is impractical to supply electricity and in which the environment is particularly harsh, and the danger of theft of expensive electrical equipment is high. For example, the use of such a system in a newspaper vending box would be impractical both from a cost and from an environment standpoint.

Other systems have been proposed for encoded cash replacement cards incorporating magnetic information exclusively. Examples of these types of encoding and reading systems are known in U.S. Pat. No. 3,283,303, issued Nov. 1, 1966 to C.D. Cerf; U.S. Pat. No. 3,508,032 issued Apr. 21, 1970, to D.L. MacDuffee et al; U.S. Pat. No. 3,634,656, issued Jan. 11, 1972 to Kenneth Robert Krechmer et al; U.S. Pat. No. 3,641,318, issued Feb. 8, 1972 to Gunnar Tollet; and U.S. Pat. No. 3,790,754 issued Feb. 5, 1974 to Robert Black et al. The various magnetic, electrostatic and optical code readers employed in these systems are relatively expensive because of the complex reading devices required by their acceptor mechanism; and they are not suitable for environments in which a supply of electricity is impractical.

Another system that has been proposed involves cards that are encoded only by means of punched holes, but the card acceptor mechanism still requires motors and various electrical devices to read the card; and, of course, this type of system is subject to the same deficiencies of the above system for environments in which use of electricity is not feasible or cost-effective. Examples of such systems are shown in the following U.S. Pat. No. 2,577,070, issued Dec. 4, 1951 to R. E. Cheney; U.S. Pat. No. 2,760,183 issued Aug. 21, 1956 to C. L. Singleton; U.S. Pat. No. 3,018,947 issued Jan. 30, 1962 to R. W. Harruff et al; and U.S. Pat. No. 3,139,520 issued June 30, 1954 to T. Gassino.

When magnetic or electrostatic or optical coating is employed on an encoded card, it is possible to encode the card in such a manner that the counterfeiting of the card is extremely difficult. However, when only punched apertures in a printed circuit card are to be employed because of the lack of electricity for the card acceptor the difficulty of preventing counterfeiting is greatly increased since the configuration and positioning of the apertures is readily apparent on the face of the card. The present invention is directed to a system in which punched apertures are employed in such a manner that counterfeiting will be discouraged since the encoding of the punched cards is associated with a limited time period during which the card may be used before the encoded apertures are arranged into a new code. Moreover, it is important in many applications that once the card has been utilizing during a particular time period that the card be provided with an additional disabling feature which prevents the card from again being using during the same time period.

In the illustrated embodiment this is achieved after the first use of the card by punching out a disable aperture in the card at a location which changes each time that the verification code apertures are altered. Thus, when the disable aperture is not punched, but the verification apertures indicate to the sensing device that the card acceptor is valid, the card acceptor initiates a useful function and the disable aperture is punched out so that the second time the card is inserted into the card acceptor the function will not be requested even if the encoded apertures match the sensing pins of the card acceptor.

For many applications, the cost of providing a cash replacement card system with security against unauthorized use and counterfeiting must be kept at a minimum cost to be economically feasible. One example is use in vending newspaper boxes on street corners where high costs are prohibitive. Also, it is necessary in such applications to insure that access codes for the systems can be changed periodically in an easy manner without disassembly of the card acceptor since the cards that are employed are designed to have a limited time period of usefulness.

The incorporation of sensing codes which must be sensed by a sensing means in a card acceptor before a punching operation can be performed is disclosed in U.S. Pat. No. 2,980,319 to John Clemens et al in which the sensing pins had to be aligned with punched apertures in the card before the punching operation could occur. However, once the hole was punched in the card indicating that it had been used, it was merely useful as a visual indication to an operator that he was not to employ the same card again since the card acceptor could be operated a second time merely by inserting the card into it. Although the Clemens system was improved later, as shown in the Harruff et al U.S. Pat. No. 3,018,947, sensing of whether a previous hole was punched or not at a given location was done electrically in the Harruff et al device.

The use of locating holes to insure that a card was properly positioned in a sensing machine to render a punch ineffective if any of the sensing holes were not sensed by a sensing pin in the card acceptor is shown in the W. B. C. Watkin U.S. Pat. No. 2,798,668, issued July 9, 1957. In the Watkin's device, however, there was no sensing of whether or not a punched hole had previously been punched in the card; and the punch could, therefore, pass the already punched open hole any number of times.

An apparatus for reading punched cards which has a punch mechanism that will punch a disable aperture once a number of sensing apertures are properly aligned in the card acceptor is shown in U.S. Pat. No. 3,695,510, issued Oct. 3, 1979 to Ferdinand Ruesch. This system required electrical auxiliary equipment for operation rather than a mechanical construction which may be used in a variety of harsh environments, such as the present invention does. Furthermore, the sensing holes employed on the card of the Ruesch patent are intended to supply instructions to a machine and their encoding is done strictly by location of the holes and not done by a combination of shape and orientation as in the present invention.

The illustrated embodiment of the present invention shows a newpaper vending box version of the present invention. The use of punched encoded cards to replace cash in newspaper vending boxes offers a number of desirable features which appeal to newspaper publishers. Such a card cash replacement system allows the publishers to collect for payment of a card before it is used thereby allowing them to invest or otherwise utilize the pre-paid amount. In addition there should be a reduction in box vandalism since the amount of cash retained in the box may either be reduced, or if desired, completely eliminated. Furthermore, the inconvenience to the truck drivers who distribute the papers of having to carry heavy coin bags is reduced or eliminated. Similar advantages may be expected in other applications where the card and card acceptor system of the present invention may be used.

The use of the cash replacement system of the present invention in newspaper vending boxes is further desirable in that the card may be used for advertising or promotional activities associated with the newspaper, or with other goods or services advertised in the newspaper. The punched out chips from the card may be more easily collected than coins, and they lend themselves readily to automated auditing and counting systems, which can be used to verify circulation data, which is of course extremely important for newspapers in obtaining and maintaining advertising revenues.

In the case replacement card system of the illustrated newpaper vending box embodiment, each time that a paper is purchased, the acceptor mechanism for the newspaper box punches out a small circular chip from the card which preferably bears the printed date of sale. Each card is designed for use in a specific month only, which may be imprinted on the card, and the circular chips that bear the dates of this month are arranged in a circle so that each are punched out in succession as the card is used. The user may thereby also visually verify the used and unused dates on the card. Cash replacement cards may be sold in various combinations so that a card may be good for both daily and Sunday papers or for daily papers only. The daily only cards may be identical to the Saturday and Sunday cards with the Saturday and Sunday positions prepunched.

The cash replacement card of the present invention is utilized by inserting it into a slot of the card acceptor which is located in the newspaper vending box. The card has a plurality of verification apertures that are punched into it, which in the illustrated embodiment has a "D" shape. When correspondingly shaped verification acceptor pins in the acceptor mechanism are positioned into the encoded verification apertures in the card, the latch on the door box of the vending machine is allowed to open as the customer operates the handle mechanism. With three simple verification hole configurations of the illustrated embodiment, it is possible to have sixty-four separate combinations if the D-shaped apertures are allowed to have four separate orientations. The code may be annually set on the first day of each month by the newspaper vending driver and the punching position may be advanced manually each day to the current day when the vending box is stocked with newspapers. At the end of the month a new card will be required which has a new orientation of the three sensing apertures.

Although a counterfeiter could produce cards having the predetermined orientation, the limited time period which the card is available for use in many instances would make it economically impractical for the counterfeiter to do so. Moreover, the D-shaped holes in the card will not cause actuation merely by providing oversize apertures at the sensing locations since the matching sensor pins in the card mechanism have a D-shaped probe section which fits into the D-shaped apertures in the cards and also a card engagement section which engages the cards when the D-shaped probe section is in the sensing aperture. This locates the pins at predetermined vertical positions which allows a sensing plate with protrusions on it to rotate beyond an operating point so that the door is unlatched only if all of the sensing pins are properly aligned into the D-shaped sensing apertures.

The card acceptor of the disclosed embodiment is entirely mechanical and requires no electricity. The punch is driven through the operation of a manually operated lever so that when the acceptor code provided by the encoded apertures of the card is correct and matches the sensing verification pins of the card acceptor, the chip for that particular data will be punched out upon unlatching of the door. A significant advantage of punching a chip out each day a paper is sold is that the chip may be used to provide an audit trail for circulation purposes. In order to best implement this audit trail when plastic is used for the encoded card material, it is desirable to coat the area in which the chips are punched out with a conductive material, such as conductive ink, in order to reduce the residual electrostatic charge which prevents the chips from sticking together and interfering with accurate counting and tabulating by automatic chip counters and audit machines. As an alternative, an anti-static agent could be included into the plastic material of the card when it is manufactured in a manner similar to that shown in U.S. Pat. No. 4,247,002, issued Jan. 27, 1981 to Richard C. Horian.

DESCRIPTION OF THE DRAWINGS

The present invention is described by reference to the drawings in which:

FIG. 5 is a cross-sectional view of the card acceptor of the present invention;

FIG. 6 is a side view of the operating handle of the card acceptor of FIG. 5;

FIG. 7 is a broken-away, partial cross-sectional view of the operating handle of FIG. 6;

FIG. 8 is a partial end view of the operating handle section of FIG. 7;

FIG. 9 is a plan view of the date adjustment tool for use with the handle of FIG. 6;

FIG. 10 is a partial view which shows the locking feature that secures the acceptor mechanism in the vending box;

FIG. 16 is a side view of the punch cam of the card acceptor;

FIG. 17 is a perspective top view of the three-fingered spring washer used in the card acceptor;

FIG. 18 is the top view of the detent plate of the card acceptor;

FIG. 19 is a view of the bottom of the punch carrier and punch of the card acceptor;

FIG. 20 is a perspective view of the center shaft of the punch carrier;

FIG. 21 is a top view of the card guide member;

FIG. 22 is the top view of the die plate of the card acceptor;

FIG. 23 is the top view of the stripper plate of the card acceptor; and

TECHNICAL DESCRIPTION OF THE INVENTION

The cash replacement system of the present invention illustrated in the embodiment of FIGS. 1–23 is particularly useful in obtaining items, such as newspapers from a vending box which is unattended, where there is no electrical source of power. The encoded card 20 in this embodiment may be rectangular in shape and may correspond in size approximately to the size of conventional credit cards. It is preferably made of plastic material which may be a polyvinyl chloride on the order of 15 mils in thickness.

A plurality of D-shaped code apertures 22, 24, 26 are punched into the card with predetermined orientations. Each of the D-shaped apertures may assume a number of orientations. In order to simplify construction, the straight portion of the D-shaped aperture may be aligned either along the X or the Y axis, which provides for a total of four different orientations. With this encoding, the combination of three holes and four possible orientations for each of these apertures, provides for sixty-four different variations which may be increased or decreased by providing for more apertures or a greater number of different orientation alignments per aperture. The D-shaped apertures are used to verify that the particular card that is inserted into a card acceptor is valid for a predetermined period of time, such as one month, which is determined by the setting of the verification sensing pins in the card acceptor. A portion of these pins will fit into the code apertures in the cards to allow the card acceptor to be operated as will subsequently be described in more detail. A number of rings 28 are printed with a conductive ink aligned along the imaginary circle line 30. Each of the conductive rings 28 define a punch location at which a chip may be punched out when the card is inserted into a card acceptor and the acceptor operates. The punch of the card acceptor is aligned with a particular conductive ring which is punched out on a particular date when a newspaper is to be sold to the card holder. Conductive ink for the rings may have a resistance up to approximately $10^8$ ohms per square in order to discharge any static charge from the cards, and thereby prevent the chips from sticking together so that they may be counted or tabulated by automatic machinery. The central area 32 of each conductive dot could if desired be coated with a micro-particle identification material of the type shown in U.S. Pat. No. 4,053,433 issued Oct. 11, 1977 to Pui Kumlee, which is assigned on its face to the Minnesota Mining and Manufacturing Company. With this type of micro-particle identification system, a great variety of coded combinations may be employed to provide, for example, identification of areas of distribution, days of the week, distinction of weekdays from Sundays, and a large variety of other desirable audit provisions.

Figure 1:
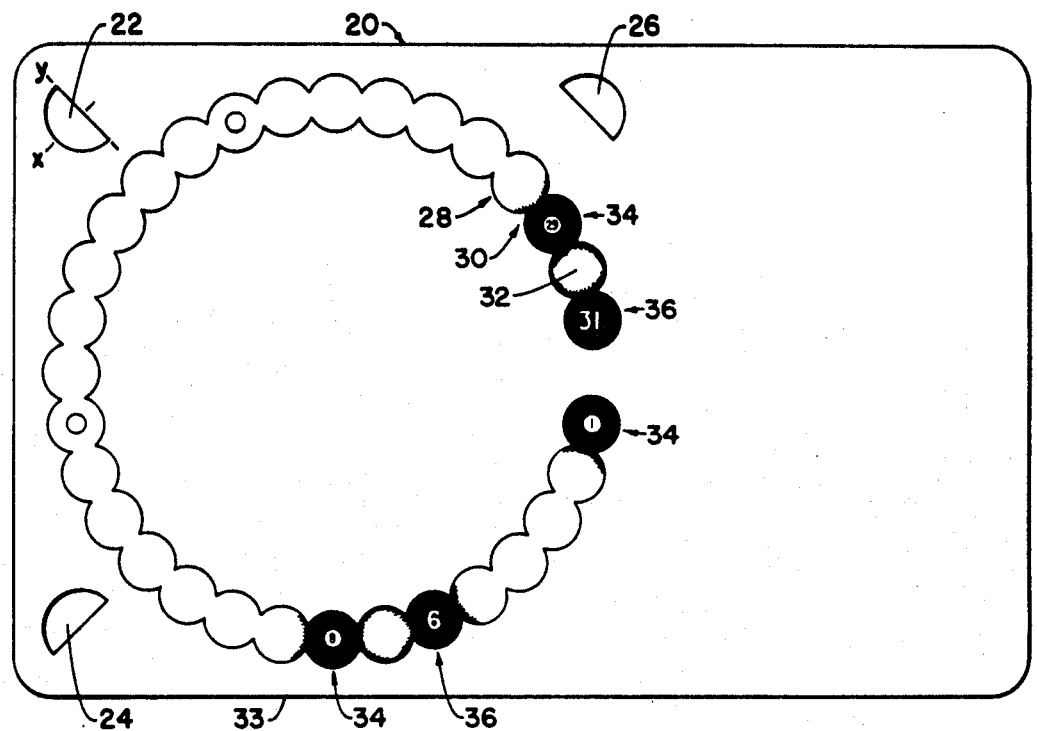
FIG. 1 is a bottom view of an embodiment of the plastic cash replacement card of the present invention.
Figure 2:
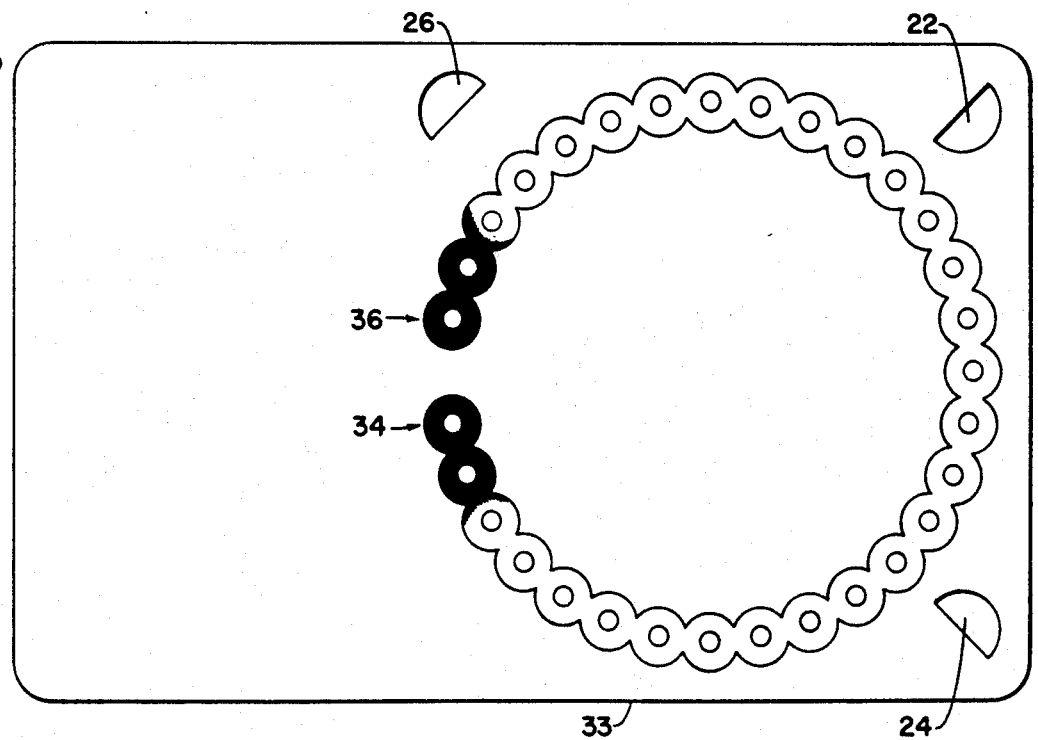
FIG. 2 is a top view of the cash replacement card of FIG. 1.

The front side of the card is shown in FIG. 2 in which the left hand side of the card 33 of FIG. 1 is flipped over so that it now forms the right hand side of the card of FIG. 2. The front side of the card may also be provided with a conductive ink pattern of rings 34 and dots 36. Numbers 1–31 may be printed so as to be visually apparent and to correspond with the days of the month wherein the maximum number of thirty-one days will be printed. The particular card that is illustrated in FIG. 2 is a card for the month March 1981. The dates 1, 8, 15, 22, and 29 correspond to Sundays for this month; and the numbers for these dates may be formed by first prnting a conductive ring 34 and then printing the number in positive form which corresponds to that particular date on the inside of the conductive ring, as shown by the representative numbers 1, 8 and 29. The other conductive dots 36, which represent weekdays, are printed so the date appears in negative form as shown by the representative numbers 6 and 31. The difference in printing of the dates between the weekday dots 36, and the Sunday rings 34 may thus be sensed by optical sensors which can provide for an audit check of this difference.

Figure 4:
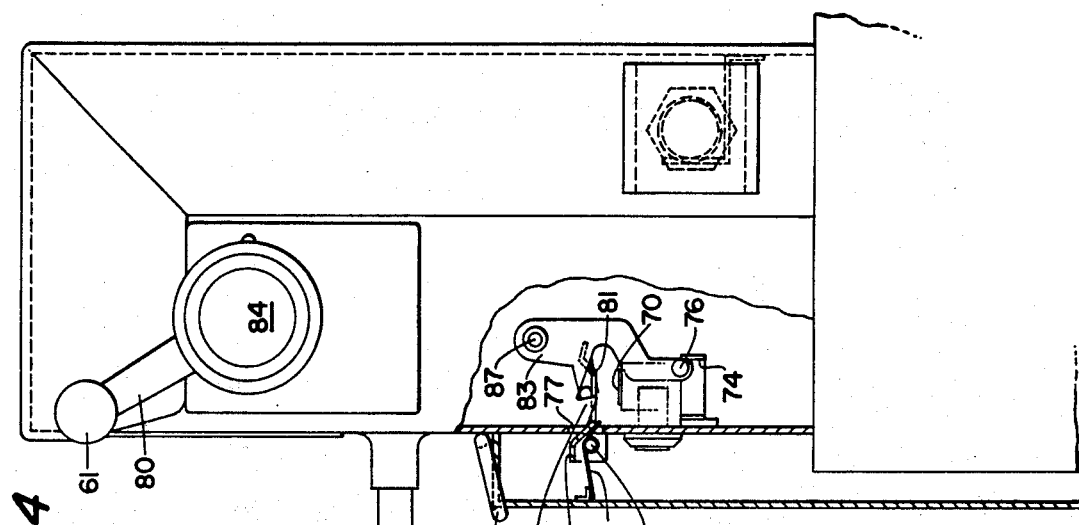
FIG. 4 is a side view of the partial showing of the newspaper box of FIG. 3.
Figure 3:
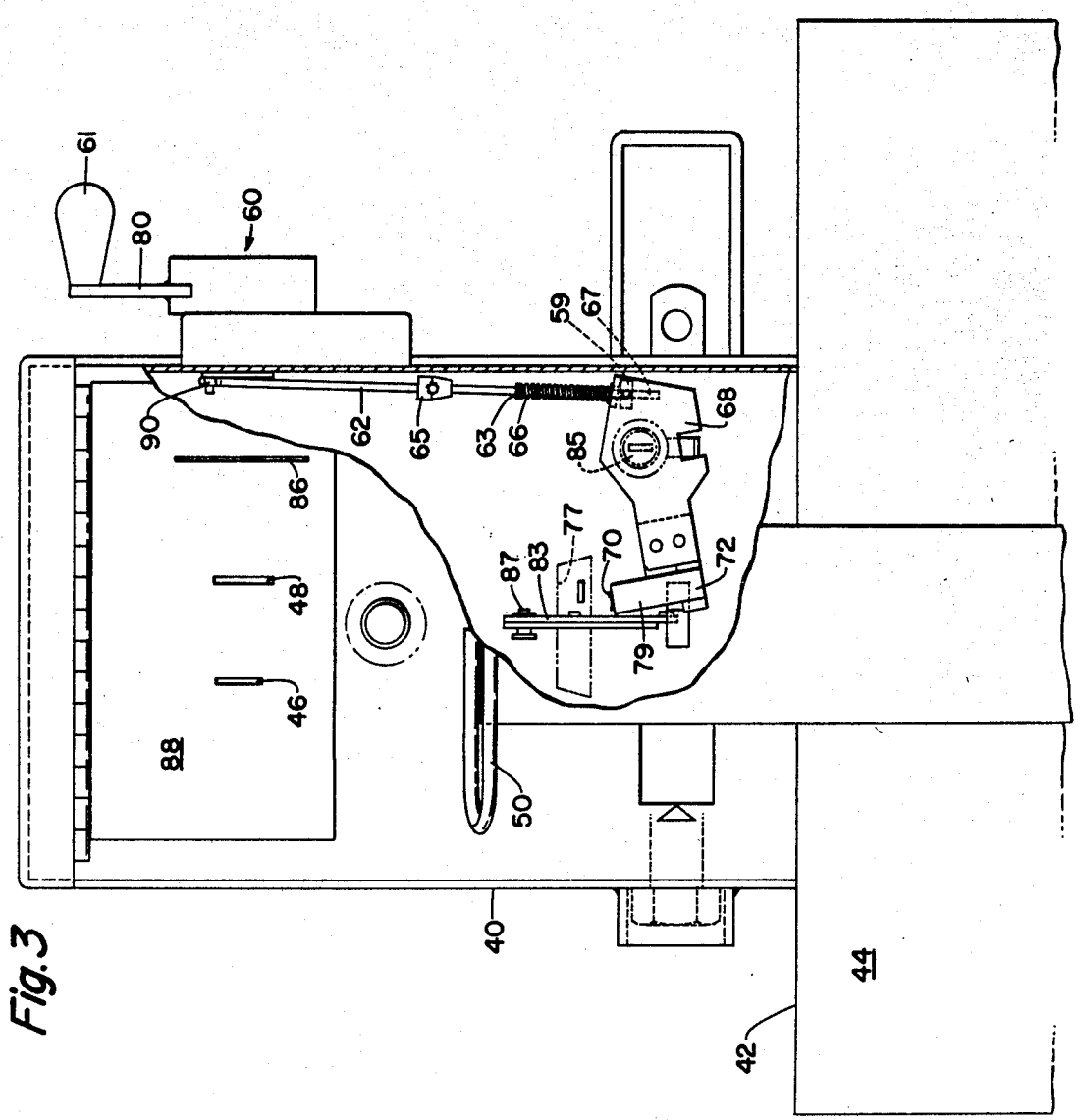
FIG. 3 is a partial front view of a top portion of a newspaper vending box which incorporates the card acceptor of the present invention and which shows the unmatching mechanism and the operating handle.

An acceptor mechanism for a newspaper vending box, and its component parts, which can be used with cards shown in FIGS. 1 and 2, is shown in the remaining FIGS. 3–23. A portion of the front of the commonly used newpaper vending box is shown in FIGS. 3 and 4. In the illustrated embodiment the coin acceptor mechanism which is now commonly used to vend newspapers may also be utilized in the same box as the card acceptor mechanism of the present invention. The card acceptor mechanism is housed in the vending box 40 which is constructed in a rugged manner to discourage vandalism and theft of deposited coins. The newspapers are retained in the lower section 42 of the box and are accessible when the door 44 is unlatched. After the insertion of the correct amount of coins into the slots 46, 48, the customer first pulls on the handle 61 and then pulls on the door handle 50 which allows the door to pivot downwardly, thereby exposing the stock of newspapers which are in the box.

A door unlatching mechanism that is used in conjunction with a coin acceptor mechanism of a prior vending box is illustrated in U.S. Pat. No. 3,265,177, issued Aug. 9, 1969 to K. Knickerbocker. The latch tongue 69, the pivot pin 71 and the coil spring 73 of FIG. 4 of the present invention may be the same mechanism as that used with the coin acceptor unlatching mechanism of the Knickerbocker patent. The forward end of the latch tongue 69 projects through a slot 77 in the door. The tongue 69 is free to pivot about the pivot pin 71 against the force of the spring 73 thereby preventing it from being pulled forward until the correct amount of coins are inserted into the coin acceptor mechanism. The coins bear against the rear portion 81 of the latch tongue 69 which prevent the tongue 69 from pivoting which cams the latch tongue 69 so it can slip through the slot 77.

Figure 15:
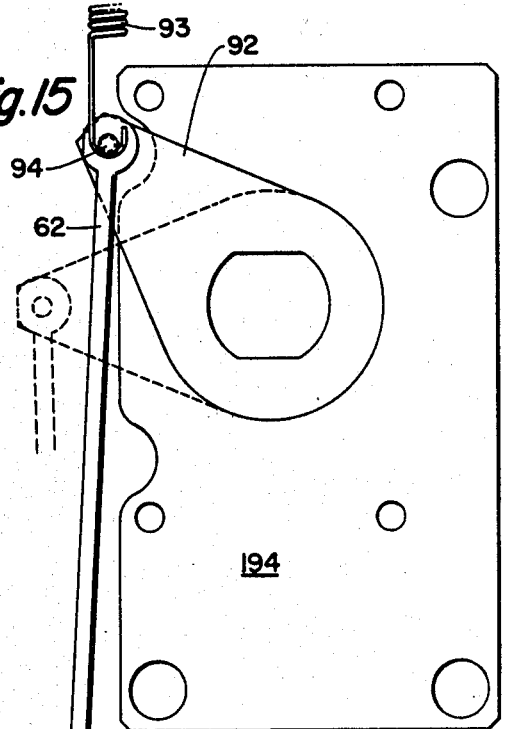
FIG. 15 is a partial side view that shows the door latching mechanism of a newspaper vending box.

In the present invention the door is unlatched by operation of a manual operating mechanism 60 which is attached to the side of the vending box. The card acceptor mechanism is constructed so that the operating mechanism 60 is not allowed to complete its full travel until an acceptable card has been inserted into the card acceptor, which is verified when the sensing pins fall into the encoded D-shaped apertures of the card and successful punching of the correct date location takes place. After insertion of the card in the card acceptor, the customer pulls on the handle 61 which causes the lever 80 to rotate the operating mechanism 60. When the operating mechanism 60 rotates, it rotates the crank arm 92 against the restraining force of the spring 93 (FIG. 15). The crank arm 92 has a pin 94 in it which is in alignment with the hole in the eyelet 90 of the connecting rod 62. The connecting rod 62 has a collar 65 on its which is displaced above the top 63 of the coil spring 66 which encircles the rod 62, when the handle 61 is not actuated, while the lower end 67 of the rod 62 projects past spring stop 59 that is secured to the pivotable latch arm 68. When the handle is actuated the collar 65 moves down with the rod due to rotation of the operating mechanism 60 and the corresponding downward displacement of the rod 62 so the collar 65 is forced against the spring 66 compressing it and placing force on the right hand end of the latch arm 68.

The latch tongue 69 is free to pivot somewhat about the pivot pin 71 when the operating mechanism 60 is not operated. When the operating mechanism 60 is operated fully, after insertion of an appropriate card into the card acceptor, the latch arm 68 is free to pivot about its pivot pin 85 in a clockwise direction, as viewed in FIG. 3, due to the downward force of the collar 65 on the spring 66. A magnet holder 72 at the inner end 79 of the latch arm 68 supports the magnet 70. The magnet 70 is attracted to the latch tongue 69 when the latch arm 68 is in its fully clockwise rotated position which allows the door of the vending box to be released even if the handle 61 has been returned to its initial position. With the magnet 70 attached to the latch tongue 69, a projecting pin 74 on the bottom of the magnet holder 72 engages a stop 76 of the release arm 83 which pivots about the pivot pin 87. The finger 89 of the release plate 83 then prevents the latch tongue 69 from pivoting, which allows it to be cammed through the slot 77 when the customer pulls on the door handle 50.

The handle 61 for operating the operatng mechanism 60 is on the end of the lever 80 which rotates the crank arm 92. An adjustable dial indicator 84 is rotatably secured in the housing and is indexed daily so as to indicate the correct date. When the dial is indexed to indicate the correct date, the punch also is indexed to punch out a chip from the inserted card at a location that corresponds to the current date. The slot 86 in the panel 88 is the slot through which the card must be inserted for operation which must have the correct orientation of the code apertures 22, 24, 26 in order for the door to be opened.

Figure 11:
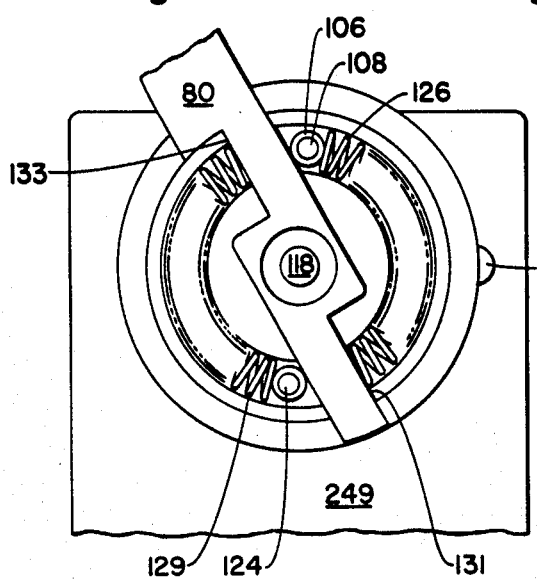
FIG. 11 is a side view of the springs and the lever of the operating handle with the data cover removed.

FIG. 5 shows a cross-sectional view of the major components of the card acceptor mechanism of the present invention. The operating handle 61 which is connected to the lever arm 80 has a spacer 106 which is positioned to surround the post 108 for alignment. The lever arm 80 is secured to the lower dial indicator housing 113 that surrounds inner and outer sleeves 111, 112 by the weld 114. An indicating dial 84 is secured to a central shaft 118 by the welds 120, 122. Thus, the lower handle sleeve 111 can rotate independently of the rotation of the indicating dial 84 and the shaft 118. The post 108 is spaced from a second post 124 on opposite sides of the lever arm 80. The post 124 also has a surrounding sleeve bearing. A pair of coil springs 126, 129 are positioned inside the housing of the operating mechanism 60 behind the dial indicator 84 so they are flexed along a generally circular path, as shown in FIG. 11. One end of the spring 126 engages the sleeve bearing around the post 108 and the other end of the spring 126 engages the surface 131 of the lever arm 80. One end of the spring 129 correspondingly engages the sleeve bearing around the post 124 while the other end of the spring 129 engages the oppositely facing surface 133 of the lever arm 80. The springs 126 and 129, thereby, provide the lever arm and hence the operating mechanism with a torque-limiting action that minimizes damage due to the application of excessive force on the lever arm 80 as it pivots about the shaft 118.

Figure 13:
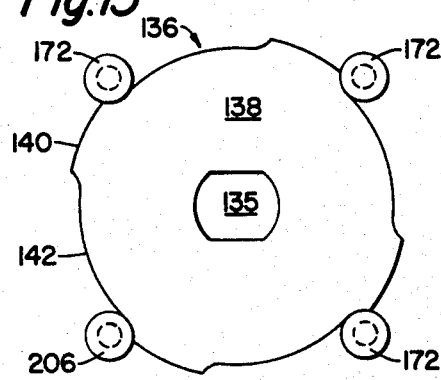
FIG. 13 is a top view of the rotary sensor plate and sensing pins with sensor plate being in a blocked position.
Figure 14:
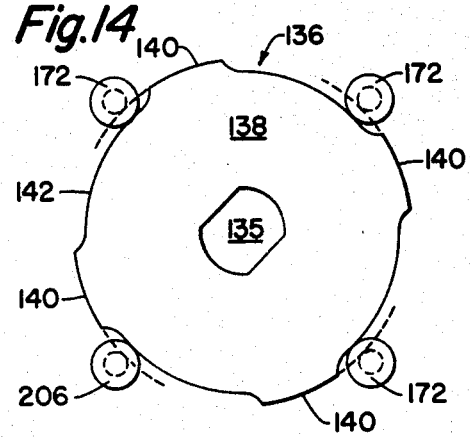
FIG. 14 is a top view of the rotary sensor plate and the sensing pins with the sensor pins on an unblocked position.

The shaft 118 has a circular groove 125 into which a pin 127 is inserted to keep the shaft from pulling out of the handle portion of the device. The shaft is slotted to form two bifurcated arms 128, 130 which receive the extension 132 of the drive shaft 134 which is received in and rotates with the main shaft 137. The main shaft 137 projects through the hole 135 in the rotary sensor plate housing 136, the top view which is shown in FIGS. 13 and 14 so that the sensor plate housing 136 turns with the main shaft 137. The upper surface 138 of the sensor plate housing 136 is shown to have a number of projections 140 on it which project beyond the nominal outside circumference 142 of the sensor plate housing 136. These projections are used to prevent the punching mechanism from operating whenever an inserted card does not have a code which corresponds to the code provided by the D-shaped holes 22, 24, 26 or whenever a verification code is correct but the chip for a particular date has already been punched out.

The sensor plate housing 136 is rotated by the main shaft which also has downwardly extending side walls 144 which carry a plurality of rollers 146 in which three rollers are illustrated in the present embodiment. The rollers 146 serve as cam followers, and they are mounted to the side walls 144 by means of the rivets 147 or other suitable method. The cam plate 150 has three cam surfaces 151 (FIGS. 12 and 16) which rise from a low area to a high land area 153. The cam plate 150 has three slots 154 which allow for adustability of the plate relative to the cam follower rollers 146. The cam plate 150 is locked down and secured to the lower carriage 158 by means of the screws 157. The lower handle section 111 is coupled to the sensor plate housing 136 so that when the handle 61 is operated the cam follower rollers 146 will roll up the cam surfaces 151 toward the land 153 while at the same time the three-fingered spring washer 169 (FIGS. 5 and 17) is gaining energy by being compressed between the lower carriage plate 158 and the detent plate 208. The energy of this compressed spring washer 169 is released during punching of a chip to assist in driving the punch through the card.

The punch 161 for punching the chips from the card is secured to the punch carrier 162 which has a hole 163 that fits over the main shaft 134 so the punch carrier will rotate with the main shaft 134. As the cam follower rollers approach their respective lands 153 on the top of the associated cam surfaces 151, eventually sufficient pressure will be applied by the punch to punch a chip from the encoded card and the energy from the compressed spring-washer 169 will be imparted to the punch to impart acceleration to the punch once punching action is initiated. The pins 220 which have protruding heads 222 on them limit the up and down motion of the punch carrier to control the amount of desired punching force. As the chips are punched out from the card they fall into a chip container 224 which may be removable to provide an audit count of the punches upon release of the spring 231, which is attached to the top of the chip funnel 215. Locking pins 240 are utilized to receive the ends of the locking fingers 233 to lock the card acceptor to the vending box, as shown in FIG. 10. The locking pins are on the mounting plate 196.

The encoded card to be punched is inserted between the stripper plate 164 and the die plate 166. The slot 168 provided between these plates, which is partially enclosed by the guide members 170, 171, provides for proper location of the card. When the card is properly located in the slot 168 and the punched code apertures 22, 24 and 26 are correctly aligned with the sensing pins 172, the projections 140 of the sensor plate housing 136 will be allowed to pass through the reduced diameter sections 174 of the sensing pins (FIGS. 5, 13 and 14). The sensing pins 172 are mounted so that flats on the sensing pins make friction engagement with the V-shaped arms 178 which are biased towards each other in pairs by springs 180 and are pivoted about the pivot posts 182.

Figure 12:
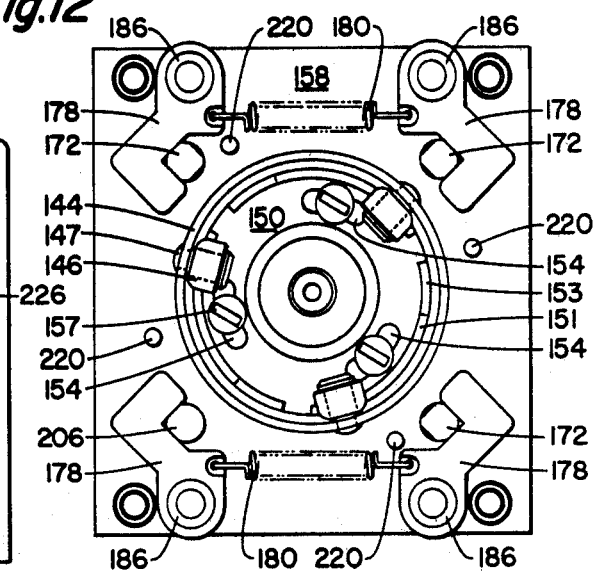
FIG. 12 is a top view of the punched cam and cam follower portion of the acceptor mechanism of the present invention.

The sensing pins 172 are all constructed in an identical manner and correspond with the D-shaped code apertures 22, 24 and 26. Another sensing pin 206 of a slightly different construction is employed to sense if the punch has punched out a chip at a particular date. Each of the pivot posts 182, as shown in FIG. 12, is positioned inside a bushing 186 which surrounds it and which is retained by snap rings 187, 189. The bushing 186 thus secures the carriage plates together as a unit. Each post 182 has an integral nut 192 at its upper ends and is threaded so as to receive the locking nuts 190 and acts as a guide for the carriage plates as they move up and down. The nuts 190, 192 are locked on the mounting plate 194.

The bottom of the three sensing pins 172 that are associated with the D-shaped apertures 22, 24, and 26 are formed with grooves 200 in them which separate two downwardly projecting sections, a short card engagement section 202 and a longer probe section 204. When a card is inserted into a card acceptor the probe section which is D-shaped to conform to the aperture of the code of the encoded apertures will project downwardly through a correctly punched and oriented aperture to provide code verification. The card engagement section 202 will then abut against the top surface of the cards, and this causes the sensing pins 172 to be positioned to the correct vertical location to allow the projection 140 to pass through the reduced diameter sections 174 at the upper ends of the sensing pins 172. If one or more of these verification holes are not punched out or are oriented other than the correct position to correspond to the position of the longer probe section 204, however, the probe section 204 for that pin will not be positioned downwardly sufficiently far to allow the corresponding projection 140 to pass through the reduced diameter section 174; and therefore, it will be blocked as shown in FIG. 13. Also, if the verification hole is punched as a circular hole rather than a D-shaped one, then the short card engagement section 202 will pass through the verification hole causing the reduced diameter section 174 to be positioned further than required, thus causing the projection 140 to be blocked.

In addition to the D-shaped verification holes, the card must not already have been punched at a particular date in question in order to have the door latching mechanism released in the manner previously described. In order to provide for a check of whether or not the chip for a particular date has already been punched, the sensing pin 206 for sensing this condition is shorter than the sensing pins 172 and has a flat bottom. A detent plate 208, which has a central opening 207, slips over the lower hub 209 of the punch carrier 162 and has a pair of bifurcated fingers 211, 213 (FIGS. 5 and 18) which pass around one of the rods 188. When the punch 161 is over a location that has already been punched out, the punch will drop through the punched out hole. This causes the sensing pin 206, which contacts the upper surface of the detent plate 208, to be at a slightly different elevation than it would be if the punch was in engagement with an unpunched location of the card due to the fact that the spring washer 169 will not be compressed as much when the punch drops through an already punched out hole. This, in turn, prevents the associated projection 140 from passing through the reduced diameter section 174 of the pin 206, thereby blocking the further operation of the card acceptor mechanism.

A shaft 210, which is secured to the stripper plate 164 by the locking member 212, passes through a hole 163 in the punch carrier 162 and the upper end of this shaft projects into a bore 205 at the bottom of the main shaft 134. The shafts 118 and 134 are rotated whenever the punch is indexed or updated to a new date. The location of the punch is determined by the positions of the three detent balls 214 relative to the ring of detent holes 165 in the punch carrier 162, each of which corresponds to a particular date and a particular punch chip location of the encoded card. The detent balls 214 are epoxied firmly into the flanged holes 216 of the detent plate 208 and move from one detent hole 165 to another in the punch carrier 162 as indexing proceeds from one date to the next. The countersunk holes 167 in the die plate 163 and the holes 173 in the stripper plate 164 are aligned with the punch 161.

In order to update the position of the punch 161, two tools are employed, one may be shaped is shown in FIG. 9. The tool 217 of FIG. 9 has an enlarged end 205 and a reduced diameter section 235 with an enlarged ring section 221 on it which allows the tool 217 to fit into the channel consisting of the bores 225, 227, and 229 when they are in alignment as shown in FIG. 5. There is one bore 229 in the indicating dial for each date position of the card. The other tool may be constructed in the same manner, but the end 205 of this tool will be positioned into the bore 219, rather than the smaller end.

When the bore 225 in the outer handle sleeve 111 and the bore 227 in the inner handle sleeve 112 are in alignment with the bore 229 in the dial indicator 84, they may be locked to rotate together by insertion of a tool 217 into the channel formed by the bores 225, 227 and 229. Alignment of these bores is accomplished by first inserting end 205 of another tool into the bore 219 of the lower handle sleeve 111 so that this tool is held against the locking pin 226. As the handle 61 is rotated by the customer the indicator housing 113 is rotated relative to the stationary support block 249 to the point where the bores 225, 227, 229 are in the position shown in FIG. 7 at which point the tool 217 is inserted. The inner sleeve 112 is now locked against rotation by the tool in the bore 219 and the dial indicator 84 and the outer sleeve 111 move a limited distance so that the enlarged ring section 221 of the tool 217 moves into the bridging gap 245. The housing 113 continues to rotate until the tool 217 is positioned in the bore 247 of the inner handle sleeve 112 at which point the tool 217 may be again removed. While the enlarged ring section 221 is in the bridging gap 245, removal of the tool 217 is not possible. When the tool 217 is in alignment with the bore 247, the punch carrier 162 and the dial indicator 84 will have been rotated exactly the correct amount to align the punch 161 over the location for the next date chip and to update the date indicated on the dial indicator 84. After indexing of the punch to the new location is accomplished, the tool 217 may be removed and the handle will then be returned to its original position with the abutment 237 against the pin 226, and the other tool may also then be removed. The magnet 70 is released from the tongue 69 when the handle 61 is at its original position. The springs 191 around the spring guide posts 193 assist in returning the carriages 158, 184 to their initial position upon release of the handle 61.

Figure 24:
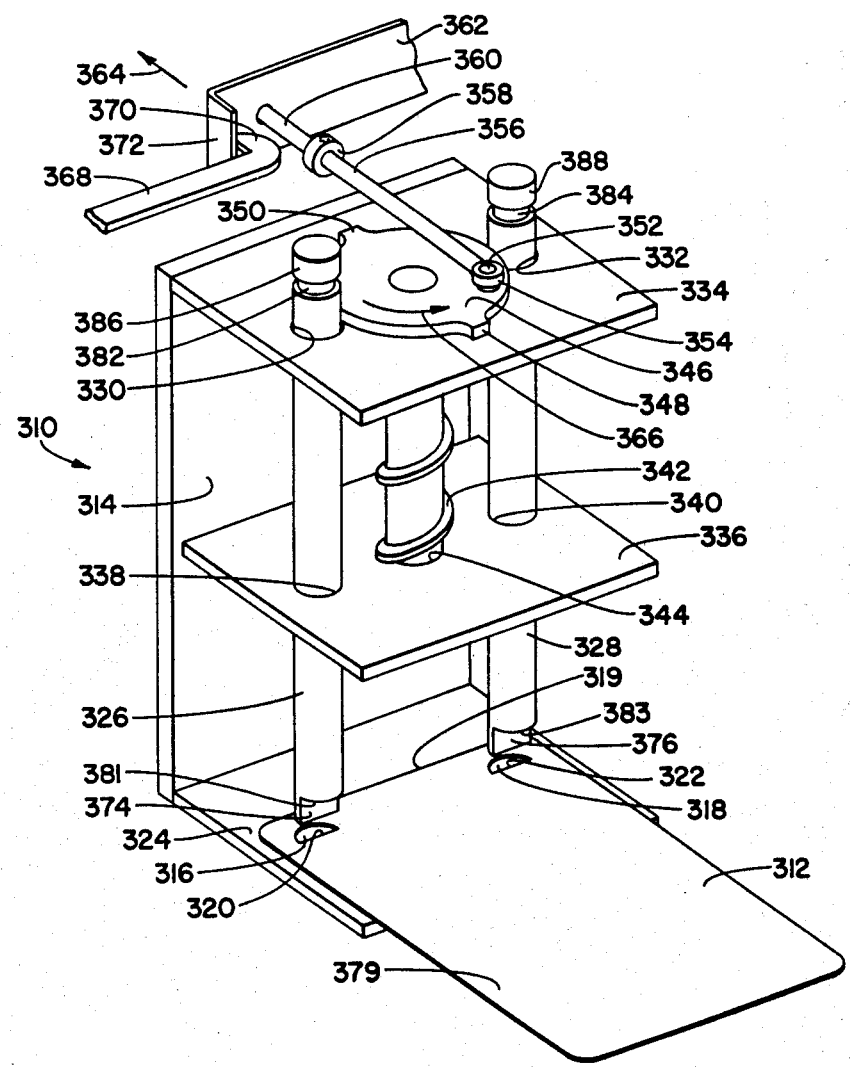
FIG. 24 is an alternate view of the present invention in which the card acceptor has sensing pins but no punch.

A second version of a cash replacement system or general control system is shown in FIG. 24 wherein the control system 310 consists of an encoded card 312 and a card acceptor mechanism 314 which accepts the encoded card. The card 312 may be a plastic card similar to a conventional credit card in size and made of a like composition. Apertures of a particular shape, which in the illustrated embodiment are in the form of semicircular holes 316, 318 of a predetermined orientation are punched through the card. The holes could if desired be of a shape other than semicircular and it is not necessary that all holes have the same configuration. In the illustrated embodiment the sides 320, 322 of the holes 316, 318 are in line with each other and are parallel to the front edge 319 of the card. The sides 320, 322 of the holes 316, 318 may if desired be independently rotated in 90° rotational increments so that each hole 320, 322 may assume one of four positions. In this manner, a total of sixteen different code combinations may be obtained. If more code combinations are desired, the holes 316, 318 may be rotated in 45° rotational increments. Of course, if more sensing holes are provided, a much greater number of different code combinations may be obtained. For example, if three sensing holes are employed, sixty-four coded combinations are possible.

The card 312 rests upon the lower surface 324 of the card acceptor mechanism 314. A pair of sensor pins 326, 328 pass through holes 330, 332 in the fixed top plate 334 which are large enough to allow the pins 326, 328 to move freely in the holes 330, 332. A moveable plate 336, below the fixed plate 334, has holes 338, 340 which receive the pins 326, 328 but these holes are relatively tight and provide for friction engagement of the pins 326, 328. A threaded shaft 342 is secured at its top to the plate 334 and is threaded through internal threads in the hole 344 in the lower plate 336. A rotatable operating plate 346 is secured to the upper end of the threaded shaft 342 and rotates therewith, according to the direction of rotation of the shaft 342.

The operating plate 346 has one protuberance 348, 350 for each of the sensor pins that are employed in the machine which are spaced from each other according to the position of the sensor pins. The plate 346 also has an eccentrically located pin 352 which is received by the coupling ring 354 of the crank arm shaft 356. The crank arm shaft 356 is secured to a second crank arm shaft 360 on the handle 362 by a coupling 358. If a person pulls on the handle 362 in an effort, for example, to obtain a newspaper from a vending box, he would initially pull the crank arm shafts 356 and 360 in the direction of the arrow 364, and this in turn will start the plate rotating normally in the direction of the arrow 366. However, the handle 362 is restrained from being completely released to open the box by means of a latch arm 368 which has latch finger 370 on it which engages the tab 372 on the handle 362 as long as the handle 362 is not pulled beyond a predetermined operating point, which point cannot be reached unless the sensor pins are positioned as they are when their probe sections fit into the correctly shaped and orientated sensing apertures of an encoded card.

The sensor pins 326, 328 are formed with lower probe sections 374, 376 which are shaped and oriented to correspond to the punched holes 316, 318 so that when the sensor pins 326, 328 are in proper alignment and orientation with respect to the holes 316, 318, the probe sections 374, 376 will extend through the holes 316, 318. The sensor pins 326, 328 also have the surfaces 378, 380 formed on them which are parallel to the surface 379 of the card 312 which contact the surface 379 when the probe sections 374, 376 project through the holes 316, 318.

As the operating plate 346 rotates, and the screw 342 moves the plate 336 downwardly, the friction fitting of the pins 326, 328 and the plate 336 carries the pins 326, 328 down toward the card 312 also. The upper end of the sensor pins 326, 328 are formed with reduced diameter groove areas 382, 384. If one or more of the holes 316, 318 are not present on the plastic card 312 when it is inserted into the acceptor mechanism, the sensor pins 326, 328 will not project downwardly sufficiently far to allow the protuberances 340, 348 to pass through the grooves 382, 384; and thus, the mechanism will not operate and the handle 362 will remain latched on the arm 368.

If the shape and orientation of the holes 316, 318 corresponds to the shape and orientation of the probe sections 374, 376 of the sensor pins 326, 328, they will drop into the holes 316, 318 and the surfaces 381, 383 will contact the upper surface 379 of the card 312. The pins 326, 328 will now be at the correct position to allow the protuberances 348, 350 to pass through the grooves 380, 384. This allows the control handle 362 to be pulled back sufficiently far so that the tab is released from the latching engagement with the finger 370 and the door of a newspaper box, for example, may be opened.

If a large opening is provided where the holes 316, 318 should be located, the sensor pins 326, 328 will drop completely through the opening onto the plates 324; and when this occurs, the upper full diameter sections 386, 388 will now be in alignment with the protuberances 348, 350 and again further movement of the plate 346 will be blocked so that the handle 362 will remain latched on the arm 368. Thus, cards with oversized holes or improper shapes will not cause the handle 362 to be released.

What is claimed is:

1. A control system comprising an encoded card and a card acceptor mechanism wherein said card comprises a thin layer of material which has a plurality of apertures therein of predetermined shape and orientation and said card acceptor mechanism comprises a card receiving section for receiving therein at least the part of said card which has said apertures therein, a plurality of sensing members which correspond in number to the number of said apertures and are each in alignment with a corresponding one of said apertures, said sensing members comprising a probe section which has a shape and orientation that corresponds to the shape and orientation of the aperture with which it is aligned so as to be capable of fitting into said corresponding aperture and a card engagement section which engages said card when said probe sections are positioned into their corresponding apertures, sensing drive means for driving said sensing members toward and away from a position where said probe sections are positioned into said apertures and function means which is constructed to provide operability of a device controlled by said system only when all of said probe means of said sensing members are positioned into a corresponding aperture in a card and all of said card engagement sections engage said card said system further comprising punch means for punching at least one hole in said card upon the first positioning of said sensing members into said apertures, and detection means shaped so as to be capable of fitting into said holes which is driven by said sensing drive means toward and away from the position where said detection means are positioned in said holes wherein said function means is constructed to prevent said operability when said detection means are positioned in prior punched holes even if said sensing members are positioned in said apertures.

2. A control system as claimed in claim 1 wherein said function means comprises a sensing enablement means having first mating members thereon and said sensing members each have a second mating member thereon wherein said sensing enablement means is constructed to rotate as said sensing drive means drives said sensing members toward said apertures, said function means being constructed to provide said operability only if said sensing enablement means rotates beyond a predetermined point, and only when all of said sensing members are positioned in their corresponding apertures.

3. A control system as claimed in claim 2 comprising punch means for punching at least one hole in said card upon the first position of said sensing members into said apertures, and detection means shaped so as to be capable of fitting into said holes which is driven by saie sensing drive means toward and away from the position where said detection means are positioned in said holes wherein said function means is constructed to prevent said operability when said detection means are positioned in prior punched holes even if said sensing members are positioned in said apertures.

4. A control system as claimed in claim 3 wherein said detection means has a second mating member and said sensing enablement means has an additional first mating member thereon which prevents said sensing enablement means from rotating beyond said predetermined point when said detection means detects that said holes have been prepunched.

5. A control system comprising an encoded card and a card acceptor mechanism wherein said card comprises a thin layer of material which has a plurality of apertures therein of predetermined shape and orientation and said card acceptor mechanism comprises a card receiving section for receiving therein at least the part of said card which has said apertures therein, a plurality of sensing members which correspond in number to the number of said apertures and are each in alignment with a corresponding one of said apertures, said sensing members comprising a probe section which has a shape and adjustable orientation that can be made to correspond to the shape and orientation of the aperture with which it is aligned so as to be capable of fitting into said corresponding aperture and a card engagement section which engages said card when said probe sections are positioned into their corresponding apertures, sensing drive means for driving said sensing members toward and away from a position where said probe sections are positioned into said apertures and control means which upon movement beyond a predetermined operation point provides operability of a device controlled by said system and operating means coupled to said control means and to said sensing drive means so as to operate said sensing drive means, said operating means and said sensing members being constructed with matching control configurations thereon, interference between said operating means and said sensing member configurations preventing the operation of said control means if either of two conditions exist, a first of said conditions being that said predetermined operation point is not reached when said sensing members have been positioned where they could feed into a corresponding aperture in a card, but said aperture is not present for at least one of said sensing members, a second of said conditions being that said sensing members are positioned according to said first condition, and at least one of said card engagement sections fails to engage said card; said control means thereby being allowed to be moved beyond said predetermined point only when all of said probe sections of said sensing members fit into said apertures and all of said card engaging sections engage said cards.

6. A control system as claimed in claim 5 comprising punch means for punching at least one hole in said card upon the first position of said sensing members into said apertures, and detection means shaped so as to be capable of fitting into said holes which is driven by said sensing drive means toward and away from the position where said detection means are positioned in said holes wherein said operating means is constructed to be prevented from operating when said detection means are positioned in prior punched holes even if it would not be prevented from functioning due to the positioning of said sensing members in said apertures.

7. A control system as claimed in claim 6 wherein said operating means comprises an operating member having first mating members thereon and said sensing members each have a second mating member thereon wherein said operating member is constructed to rotate as said sensing drive means drives said sensing member toward said apertures, said operating means being constructed to provide said operability only of said operating member rotates beyond a predetermined point, which can occur only if first and second mating members are positioned so as to allow said operating member to rotate said predetermined point and which results only when all of said sensing members are positioned in their corresponding aperture.

8. A control system as claimed in claim 5 wherein said apertures in said encoded card are approximately semicircular in shape and said probe sections of said sensing members are approximately semicircular in shape but of slightly smaller dimensions than said apertures.

9. A control system as claimed in claim 8 wherein said sensing members are elongated cylindrical pins with approximately a circular cross section, said probe sections and said card engagement sections being located at one end of said pins and a reduced diameter groove section being removed from said one end of a predetermined distance towards the other end of said pins, and said operating means comprises a rotatable operating member which has one protuberance thereon for each of said pins which are positioned so that when said probe sections of said pins all fit into a corresponding aperture in said card each of said protuberances is allowed to pass through each of said groove sections sufficiently far to allow said control means to operate beyond said operation point; said groove sections and said protuberances on said operating member otherwise being aligned to prevent further rotation of said operating member whenever all of said probe sections are not fed into all of their corresponding apertures of a correct shape and orientation in said card.

10. A control system as claimed in claim 9 wherein said operating member is a thin disc and said groove sections are adjacent said other end of said pins.

11. A control system as claimed in claim 5 wherein said sensing members are elongated cylindrical pins with approximately a circular cross section, said probe sections and said card engagement sections being located at one end of said pins and a reduced diameter groove section being removed from said one end of a predetermined distance towards the other end of said pins, and said operating means comprises a rotatable operating member which has one protuberance thereon for each of said pins which are positioned so that when said probe sections of said pins all fit into a corresponding aperture in said card each of said protuberances is allowed to pass through each of said groove sections sufficiently far to allow said control means to operate beyond said operation point; said groove sections and said protuberances on said operating member otherwise being aligned to prevent further rotation of said operating member whenever all of said probe sections are not fed into all of their corresponding apertures of a correct shape and orientation in said card.

12. A control system as claimed in claim 11 wherein said apertures in said encoded card are approximately semicircular in shape and said probe sections of said sensing members are approximately semicircular in shape but of slightly smaller dimensions than said apertures.

13. A control system as claimed in claim 12 wherein said detection means comprises at least one additional detection pin aligned with each of said holes which are constructed with a reduced diameter groove section at the end of said detection pins which is at a location removed from said card and said detection pins are capable of being inserted into said holes and said operating member has an additional protuberance for each of said detection pins which is allowed to pass through the groove sections of said detection pin sufficiently far to allow said control means to operate beyond said operation point if said detection pins are not positioned in said holes due to the prior punching of said holes in a previous operating cycle.

14. A control system as claimed in claim 13 wherein said operating member is a thin disc and said groove sections are adjacent the end of said pins that is removed from said card.

15. An acceptor mechanism for accepting an encoded card and performing a cycle of operation upon the acceptance thereof having an array of apertures which are of asymetric shape and have a predetermined orientation wherein said orientation of said apertures is associated with a particular code which is valid for a given interval of time comprising a sensing means for each aperture of said array of apertures which allows a first cycle of operation of said acceptor mechanism to occur when all of said apertures of said array of apertures have the appropriate orientation for said interval of time, punch means for punching out each of a second array of apertures in an individual manner which are associated with a subinterval of said interval of time and means for positioning said punch means to a new location when the subinterval of time associated with the old punch location has expired.

16. An acceptor mechanism as claimed in claim 15 comprising a punch sensing means which senses to determine if an aperture has been punched at said old location by said punch means and inhibit means operated by said punch sensing means which inhibits further operating cycles of said acceptor mechanism if said punch sensing means senses the presence of a punched aperture at said old location.

17. An acceptor mechanism as claimed in claim 15 further comprising a rotatable cam follower carrier, a cam follower attached to said cam follower carrier, handle mechanism for rotating said cam follower carrier and punch control means wherein said punch control means comprises a fixed cam means and said cam follower rotates relative to said cam, said cam follower comprising at least one roller on said cam follower carrier and said cam means comprises a ramp for each of said rollers wherein said rollers roll on their respective ramps toward said card in said acceptor mechanism until said punch means punches a chip from said card.

18. An acceptor mechanism as claimed in claim 17 comprising a punch sensing means which senses to determine if an aperture has been punched at said old location by said punch means and inhibit means operated by said punch sensing means which inhibits further operating cycles of said acceptor mechanism if said punch sensing means senses the presence of a punched aperture at said old location.

19. An acceptor mechanism as claimed in claim 17 wherein said punch control means comprises a resilient means which gains energy as said cam follower carrier rotates until said punch means punches said chip at which time said resilient means releases its energy to assist said punching of said chip by said punch means.

20. An acceptor mechanism as claimed in claim 17 comprising a punch sensing means which senses to determine if an aperture has been punched at said old location by said punch means and inhibit means operated by said punch sensing means which inhibits further operating cycles of said acceptor mechanism if said punch sensing means senses the presence of a punched aperture at said old location.

* * * * *